(12) United States Patent
Yi et al.

(10) Patent No.: US 7,406,257 B2
(45) Date of Patent: Jul. 29, 2008

(54) VIDEO PRESENTER INCLUDING TABLE WITH CURVED CONTOUR

(75) Inventors: Hee-myoung Yi, Seongnam-si (KR); Joo-bok Kim, Seongnam-si (KR); Michel Arney, West Newton, MA (US); Alan Chrisopher Mudd, West Newton, MA (US); James Wilson, West Newton, MA (US)

(73) Assignee: Samsung Techwin Co., Ltd. (KR)

( * ) Notice: Subject to any disclaimer, the term of this patent is extended or adjusted under 35 U.S.C. 154(b) by 868 days.

(21) Appl. No.: 10/768,295

(22) Filed: Jan. 30, 2004

(65) Prior Publication Data

US 2005/0168626 A1   Aug. 4, 2005

(51) Int. Cl.
*G03B 15/00* (2006.01)

(52) U.S. Cl. .......................................... 396/5; 396/428

(58) Field of Classification Search ...... 396/5, 396/419, 428; 348/63, 373, 375; D16/232; D14/423
See application file for complete search history.

(56) References Cited

U.S. PATENT DOCUMENTS

| 4,236,795 A | * | 12/1980 | Kephart | 396/5 |
| 5,557,663 A | | 9/1996 | Huang et al. | 379/110 |
| 5,734,417 A | * | 3/1998 | Yamamoto et al. | 348/61 |
| D436,612 S | * | 1/2001 | Geng | D16/232 |
| 6,317,155 B1 | * | 11/2001 | Ohyama | 348/373 |
| 6,411,332 B1 | | 6/2002 | Whitby et al. | 348/376 |
| D490,433 S | * | 5/2004 | Moriya et al. | D14/423 |
| D493,812 S | * | 8/2004 | Mudd et al. | D16/235 |
| D495,355 S | * | 8/2004 | Mudd et al. | D16/232 |
| 7,229,227 B2 | * | 6/2007 | McLoone et al. | 400/489 |
| 2005/0168627 A1 | * | 8/2005 | Yi et al. | 348/373 |
| 2005/0237425 A1 | * | 10/2005 | Lee et al. | 348/373 |

FOREIGN PATENT DOCUMENTS

| EP | 0749037 A3 | 12/1996 |
| EP | 1220006 A2 | 7/2002 |
| EP | 1220006 A3 | 7/2002 |
| JP | 07-074989 | 3/1995 |
| JP | 07-107377 | 4/1995 |
| JP | 09-163188 | 6/1997 |
| JP | 2003-032516 | 1/2003 |
| KR | P20-0211715 | 11/2001 |
| KR | 2003-0088520 A | 11/2003 |

* cited by examiner

*Primary Examiner*—W. B. Perkey
(74) *Attorney, Agent, or Firm*—Tuchman & Park LLC

(57) ABSTRACT

A video presenter of the invention includes: a table having a periphery with a substantially curved contour; a pivot member mounted at a side of the table; a support arm rotatably coupled with the pivot member and extended therefrom; and a camera rotatably coupled at an end of the support arm.

8 Claims, 7 Drawing Sheets

VIDEO PRESENTER INCLUDING TABLE WITH CURVED CONTOUR

FIELD OF THE INVENTION

The present invention relates to a video presenter, more particularly to a video presenter or video image input device including a table with its periphery being formed of a substantially curved contour.

BACKGROUND OF THE INVENTION

In general, a video presenter photographs an object using a CCD camera and displays the photographed object on a monitor, and is widely used for educational and industrial purposes. The video presenter can display a magnified image of a tiny object on the monitor by using a lens unit such as a microscope lens to magnify the object taken by the CCD camera. A variety of peripheral devices are included in the video presenter. For example, an apparatus for illuminating an object to improve a quality and sharpness of an image to be displayed through the monitor is additionally provided.

The video presenter typically includes a variety of arm structures for supporting the CCD camera. Also, it is preferable to adapt a table construction of the video presenter in such a way that the planar surface of the table may be optimally used for placing the object thereon.

The publication of Japanese patent application Hei 7-107377 discloses a video presenter, in which two arm-like camera supports are serially connected to a table by means of articulations or pivots. More specifically, a first support can be rotated with respect to the table and a second support, and the second support can be rotated with respect to the first support and the camera. For the storage of the video camera disclosed in the above-identified Japanese publication, the camera should be dismantled from the second support.

Korean Utility Model registration No. 2011715 discloses a video presenter, in which a camera is supported by a telescopic support so that the length of the support may be adjusted. Further, a pair of illumination lamps is disposed at two lateral sides of a table. With the provision of the pair of illumination lamps, the strength of the illumination will be increased.

Conventional video presenters as disclosed in the arts typically include a table whose periphery has a rectangular contour. With respect to the usage of the planar and rectangular surface of the table, the four corners of the table are not so effectively used for placing the object thereon. Thus, the corners of the rectangular table make the video presenter unnecessarily heavy and bulky. Further, the table with rectangular contour occupies a large space for storage.

SUMMARY OF THE INVENTION

An object of the present invention is to provide an improved video presenter solving the above-described problems.

Another object of the present invention is to provide a video presenter having a mechanism or structure particularly effective for usage of the table and storage of the device.

Another object of the present invention is to provide a video presenter, of which the table has a substantially curved contour.

Another object of the present invention is to provide a video presenter enabling an efficient usage of a planar surface on the table.

According to one aspect of the present invention, a video presenter comprises: a table having a top surface and a substantially curved contour; a pivot member connected at a lateral side of the table; a support arm extending from the pivot member and coupled with the pivot member rotatably; and, a camera rotatably coupled at a free end of the support arm.

According to another aspect of the present invention, the table has a generally circular shape.

According to another aspect of the present invention, the table has a generally oval shape.

According to another aspect of the present invention, a control panel including a plurality of buttons is provided on the top surface of the table, where the upper surface of each of the buttons is adapted to maintain the same level as the top surface of the table.

According to another aspect of the present invention, connection ports are provided at one lateral side of the table and power connectors are provided at another lateral side of the table.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Preferred embodiments of the present invention will be described herein below with reference to the accompanying drawings.

Figure 1:
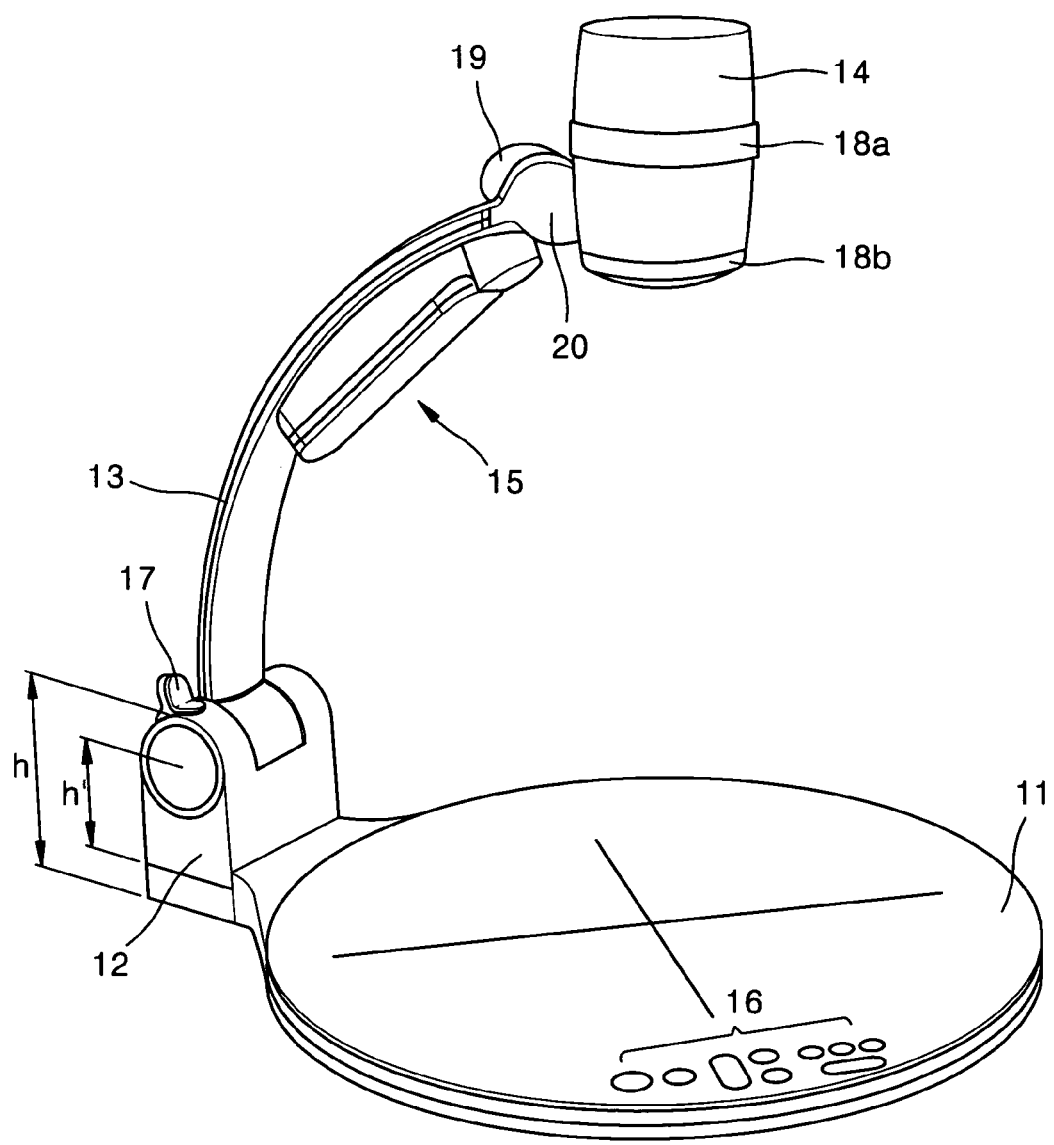
FIG. 1 shows a perspective view of a video presenter according to an embodiment of the present invention.

FIG. 1 is a perspective view of a video presenter according to one embodiment of the present invention.

Referring to FIG. 1, a video presenter of the present invention typically comprises a table 11 on which an object is to be placed for capturing an image thereof; a pivot member 12 disposed at one lateral side of the table 11; a support 13 rotatably disposed relative to the pivot number 12 and extending therefrom, and a camera head 14 roatably disposed at the upper end of the support 13. As shown in FIG. 1, the table has a generally circular outer periphery. In other words, the periphery of the table assumes a substantially curved contour. In another embodiment of the present invention, the periphery of the table has an oval contour, or at least a substantial part of the periphery of the table includes a curved shape. The configuration of the table having such a curved contour forms one major feature of the present invention.

Inside of the table 11, an electronic circuit controller is provided for processing and controlling the operations of the video presenter. The table 11 has a predetermined thickness, so that a printed circuit board can be received therein. Also, on a top surface of the table 11, a control panel 16 is provided at one lateral side. A user can select various functions of the video presenter by manipulating buttons in the control panel 16.

The table 11 is formed in the shape of a circle as shown in the drawing figures. Thus, it is possible to make use of the top circular surface of table 11 with a maximum efficiency. Typically, since the user puts the object usually at a center of the table, corners of the conventional quadrilateral table as discussed above are not used for supporting the object. Thus, with the provision of the table having the periphery of a curved shape and without corner portions, the top surface of the table can be used with a maximized efficiency.

The control panel 16 disposed on a top surface of the table 11 includes a plurality of buttons. For example, it has a power button, a lamp button, a zoom button, and one or more of image control buttons. The upper surface of each of the buttons is maintained to the same level as the top surface of the table 11, thus the buttons do not protrude above the top surface of the table 11. As a result, the table 11 has a flat surface as a whole. With the provision of the buttons that do not protrude out of the top surface of the table 11, it is possible to prevent the buttons from being accidentally pressed by the object on the table 11.

The pivot member 12 is installed at a lateral side of the table 11 and serves to support and rotatably couple with the support 13. The pivot member 12 includes a clamp lever 17. With the user's manipulation of the pivot member lever 17, the support 13 can be either in a state rotatable with respect to the pivot member 12 or in a fixed state, immovable with respect to the pivot member 12. The combination of the pivot member 12, the clamp lever 17 and the support 13 may be configured in many ways. For example, the support 13 has a rotation shaft (not shown) at a lower end thereof, and the pivot member 12 has a bearing (not shown) allowing rotation of the rotation shaft so that the support 13 can rotate with respect to the pivot member 12. Further, the clamp lever 17 can be switched between a first location and a second location on the pivot member 12. At one of the locations, the clamp lever 17 can exert a pressing force onto the rotation shaft of the support 13 so as to prevent the support 13 from rotating. An example of the rotational structure for the support and the pivot member is disclosed in Korean Utility Model Application No. 1997-52552 entitled "Arm angle adjusting device". Such known structures may be applied to the present invention.

As seen from FIG. 1, a pivot member 12 has a height h measured from a bottom surface of the table 11. A distance from the top surface of the table 11 to the center of the rotation shaft of the support 13 is indicated as h'. The structures of the pivot member 12 and the support 13, and the height h of pivot member 12 and the distance h', are preferably adapted in such a way that the camera head 14 does not go beyond the table 11 when the support 13 rotates to make the camera head 14 in close contact with the top surface of the table 11.

As shown in FIG. 1, the support 13 is formed with an arch shape. However, it should be appreciated that the support 13 is not limited to the arch shape, but may be formed with a rectilinear shape.

At an upper end of the support 13, the camera head 14 is rotatably mounted thereto. The camera head 14 comprises a camera housing and a camera is positioned therein. The camera housing, which forms the outer portion of the camera head 14, is integrally formed with a first pivot housing 20. The first pivot housing 20 is mounted in a pivotable manner to a second pivot housing 19 which is disposed at the upper end of the support rod 13.

The first pivot housing 20 and the second pivot housing 19 may be configured in many different ways. For example, a pivot shaft (not shown) is fixed at the second pivot housing 19 and a bearing (not shown) is installed within the first pivot housing 20. Also, a leaf spring (not shown) is installed between opposite sides of the first pivot housing 20 and the second pivot housing 19 so as to provide an elastic-supporting force there-between. As a result, the first and the second pivot housings 20 and 19 are maintained in a self-rotation prevented state to each other due to a friction caused by the elastic force. When the user applies an external force overcoming the frictional force caused by the leaf spring, the camera head 14 is able to rotate. Those skilled in the art, however, will understand that the rotational structure for the camera head 14 may be accomplished in many different ways other than the above-described one.

A rubber or elastic rims 18*a* and 18*b* enclose an outer surface of the camera head 14. As will be described herein below, the rubber rims 18*a* and 18*b* absorb the impact that may be occurring between the camera head 14 and the table 11 when the camera comes in contact with the top surface of the table 11. As can be seen from the drawings, the rubber rims 18*a* and 18*b* enclose a middle periphery and a lower periphery of the camera head 14, respectively.

The lamp 15 is installed at an inner portion of the curved surface of the support 13. As will be described in detail with reference to FIG. 4, the lamp 15 has a structure such that a lamp holder may be rotated with respect to a lamp mount. With the installation of the lamp 15 to the support 13, the lamp 15 occupies a position that is relatively close to the object located on the table 11. It also obviates a separate structure, such as stand-alone support arms known in the art, for supporting the lamp 15.

Figure 2:
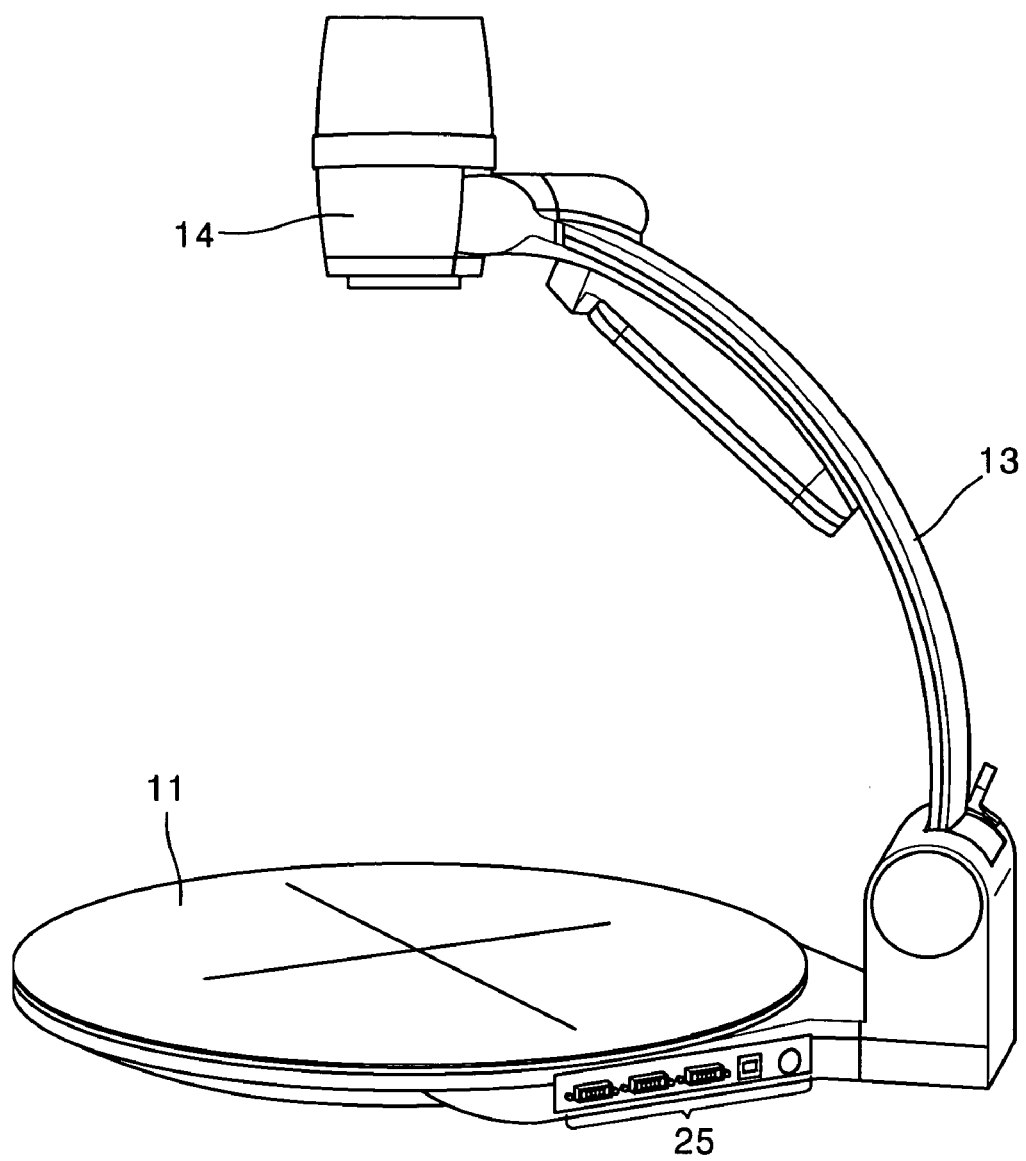
FIG. 2 shows a perspective view of the video presenter of FIG. 1 at a different angle.
Figure 3:
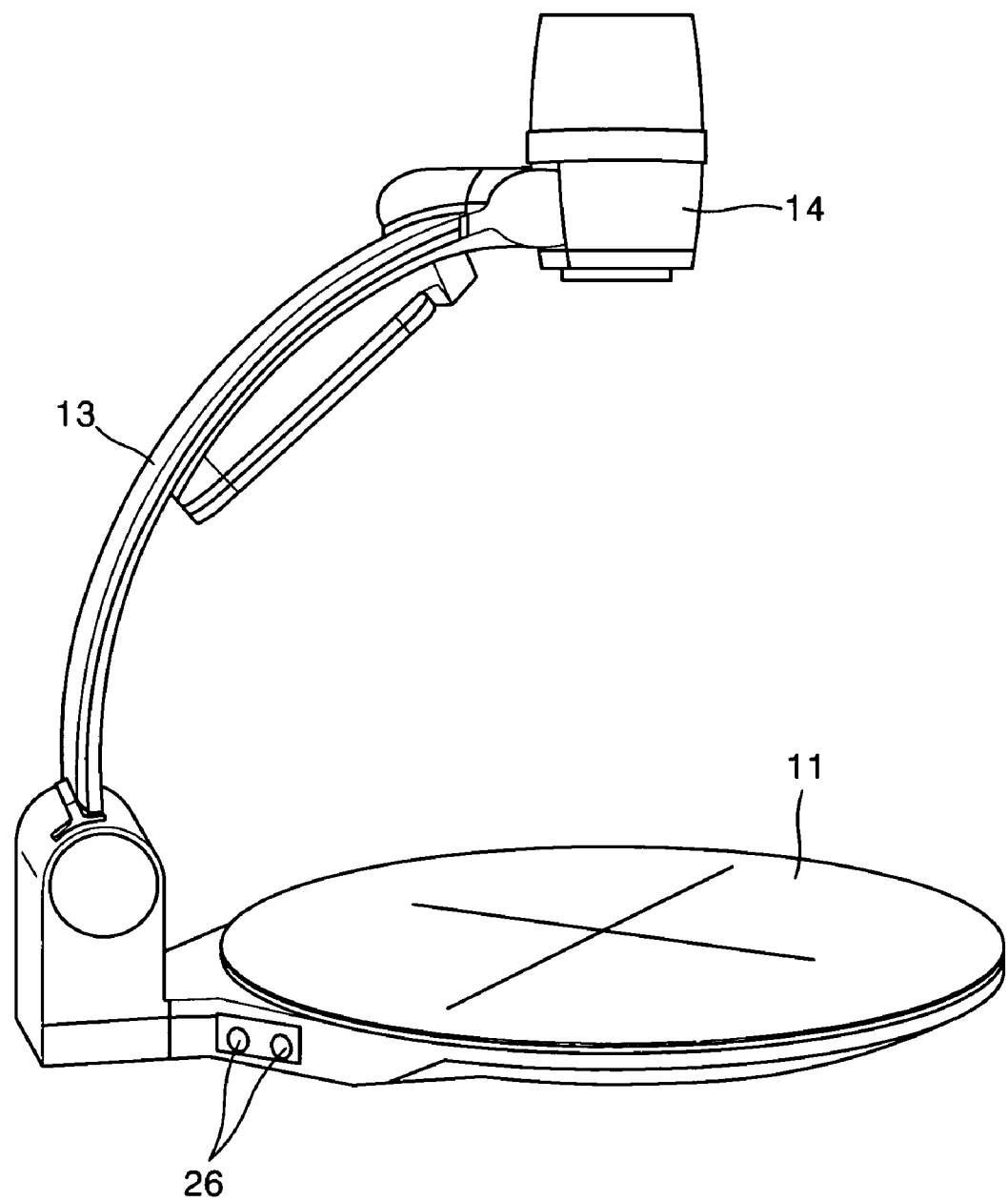
FIG. 3 shows a perspective view of the video presenter of FIG. 1 at another different angle.

FIGS. 2 and 3 show a perspective view of the video presenter of FIG. 1 at different angles, respectively.

Referring to FIG. 2, a plurality of connection ports 25 are provided at a side of the table 11 or at an extension thereof. The connection ports 25 are used to connect the video presenter to external peripheral devices. For example, the connection ports 25 may include a VGA out-port, a VGA in-port, an RS-232C port, an USB port and a mouse port.

Referring to FIG. 3, power connectors 26 are provided at another side of the table 11. The power connectors 26 may include a DC 12 volt in-connector and a DC 12 volt out-connector.

Figure 4:
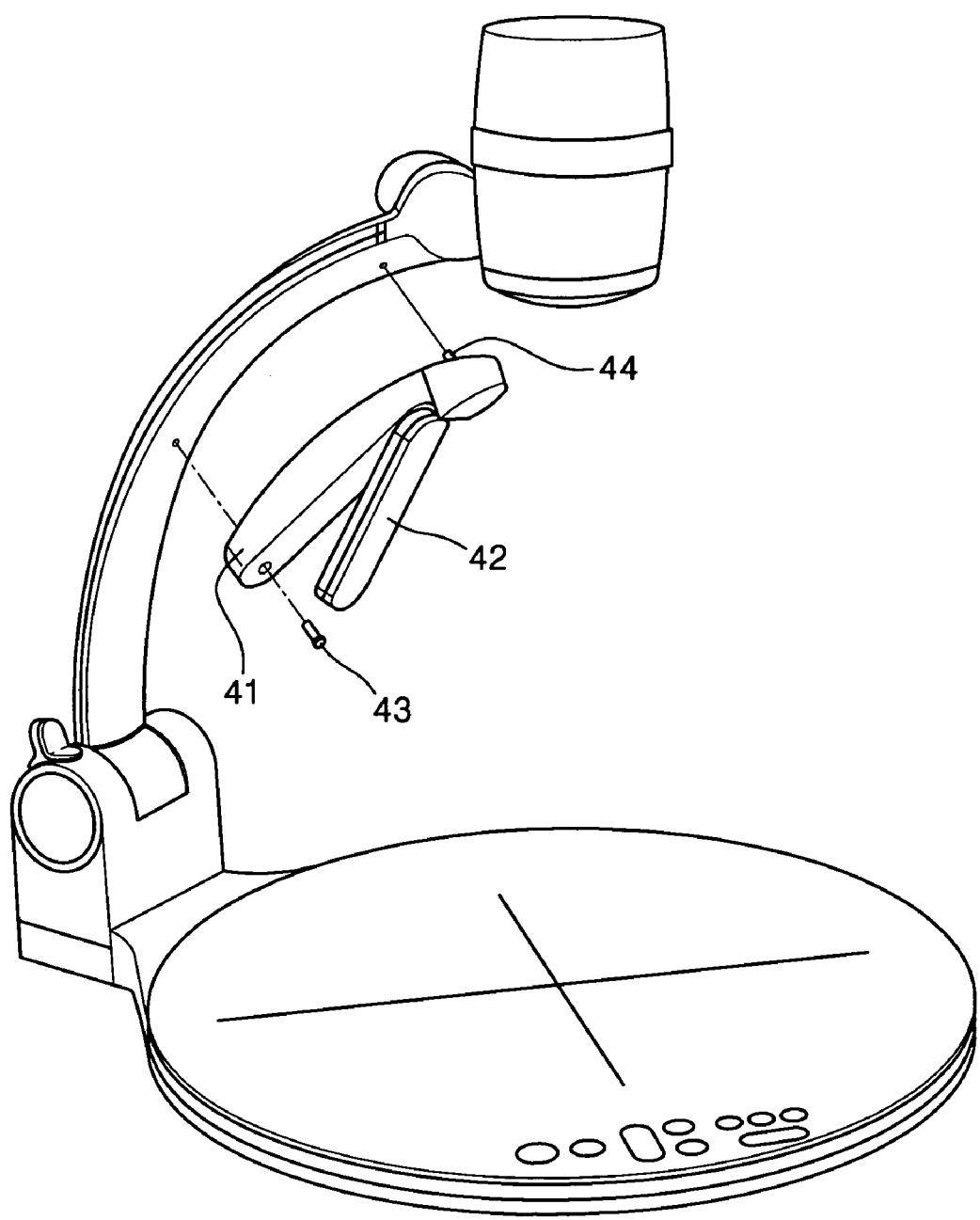
FIG. 4 shows a partially exploded, perspective view of the video presenter of FIG. 1 with the lamp disassembled therefrom.

FIG. 4 shows a view that the lamp 15 is disassembled from the video presenter of FIG. 1. Referring to FIG. 4, the lamp 15 includes lamp mount 41 and lamp holder 42. The lamp mount 41 is affixed to the support 13 using bolts 43 and 44. The lamp mount 41 has a curved mounting surface corresponding to the curved inner surface of the support 13. A lamp tube (not shown) is provided within the lamp holder 42 which can generate light to illuminate the object on the table 11 at a close distance. One end of the lamp holder 42 is pivotably attached to the lamp mount 41 enabling rotation of the lamp holder 42. With the pivotal rotation of the lamp holder 42 with respect to the lamp mount 41, the lamp 15 can illuminate the object on the table 11 at various different angles.

Figure 5:
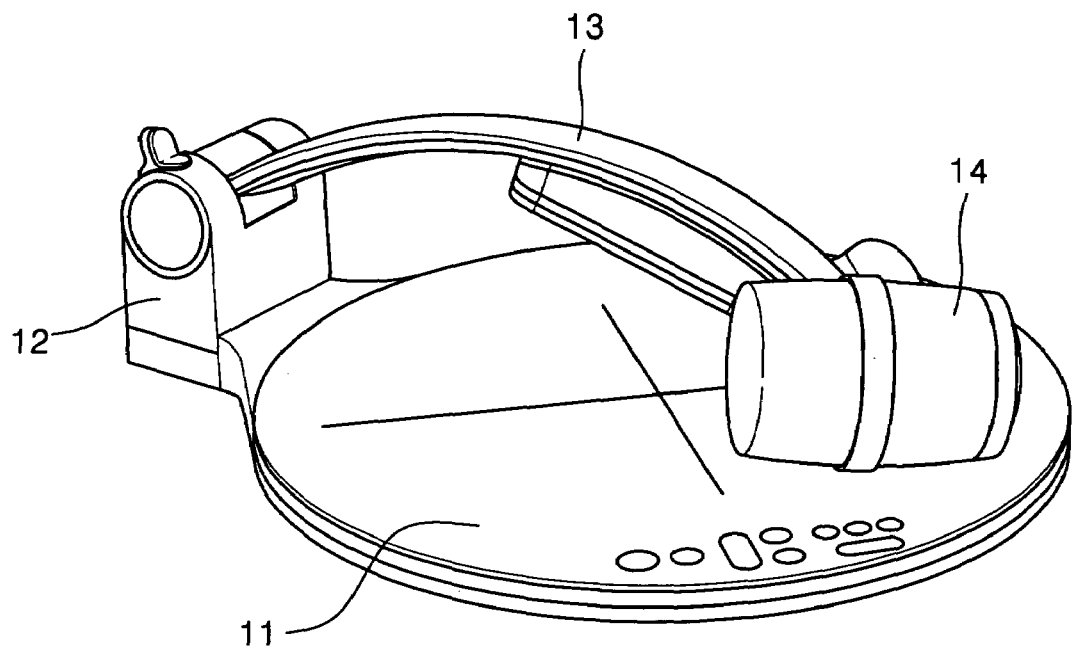
FIG. 5 shows the video presenter of FIG. 1 with the support arm being in its collapsed position; and, FIG. 6 shows an exploded view illustrating a part of the support arm of the video presenter of FIG. 1.

FIG. 5 shows the video presenter of FIG. 1 in a collapsed state. Referring to FIG. 5, a circumferential surface of the camera head 14 of the video presenter contacts the top surface of the table. For this, the first pivot housing 20 of the camera head 14 is first rotated with respect to the second pivot housing 19 attached at the end of support 13, then, support 13 is rotated downwards with respect to the pivot member 12.

As can be seen in FIG. 5, as the support 13 rotates fully making the camera head 14 in contact with the top surface of the circular table 11, the volume occupied by the video presenter is minimized. Thus, it is possible to store the video presenter in a restricted space.

Figure 6:
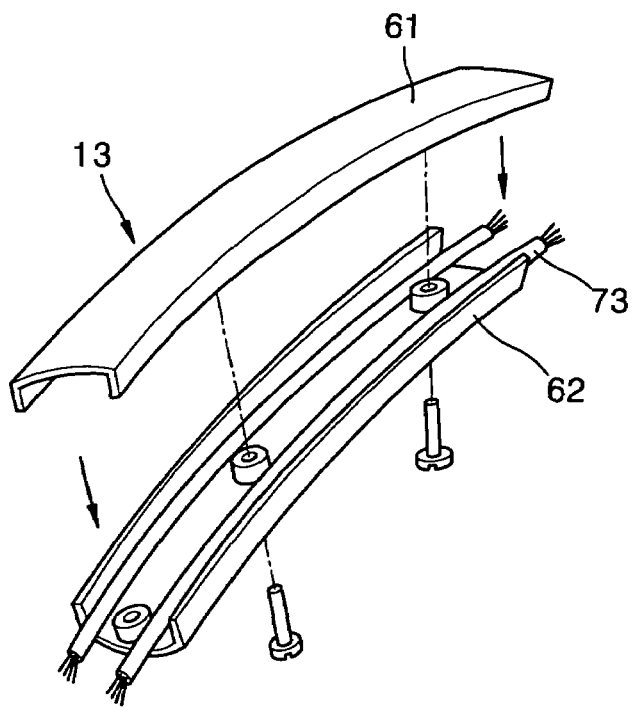

FIG. 6 shows a part of the support 13 of the video presenter. Referring to FIG. 6, the support 13 comprises a first portion 61 and a second portion 62. The first and second portions 61 and 62 of the support 13 are assembled to each other with bolts and form a space for passing cables 73 inside thereof. The cable 73 extends from the camera head 14 to a printed circuit board (not shown) in the table 11 through the support 13.

Figure 7:
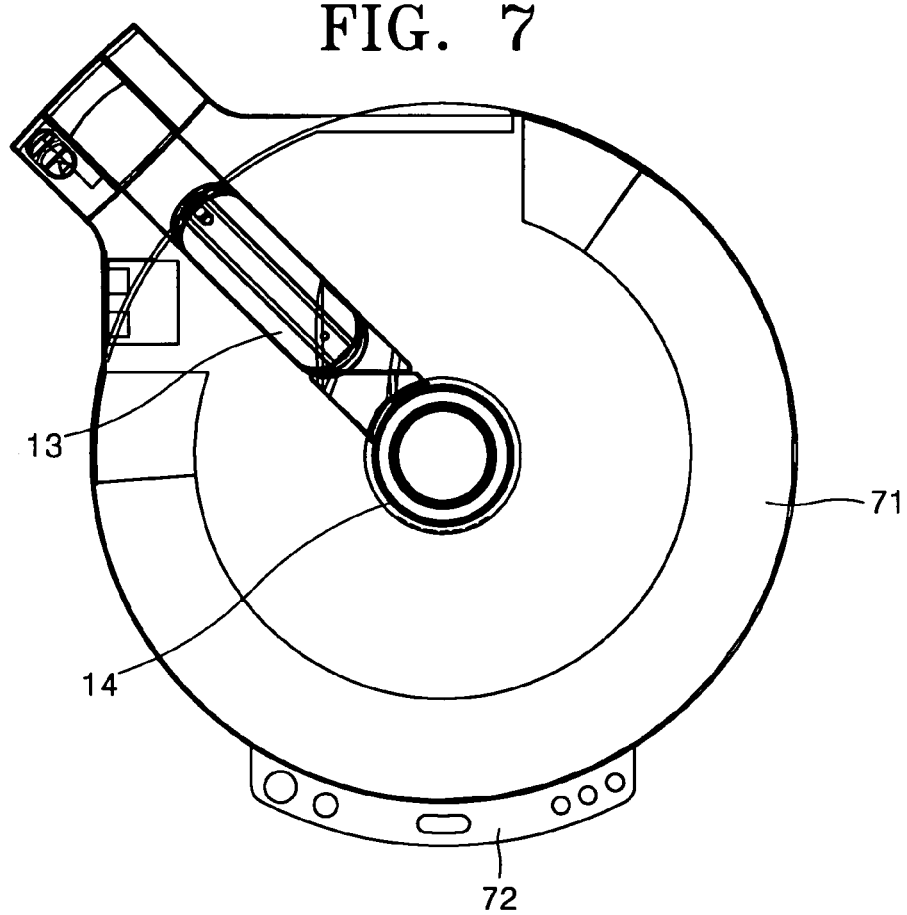
FIGS. 7 and 8 show planar views of other embodiments of the video presenter according to the present invention.
Figure 8:
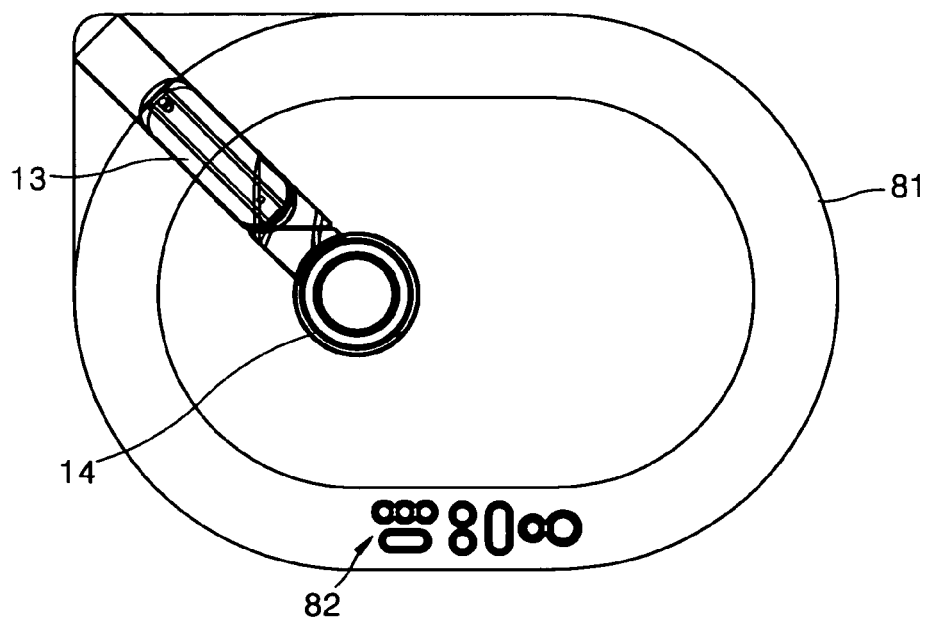

FIGS. 7 and 8 are schematic planar views of other embodiments of the video presenter according to the present invention.

Referring to FIG. 7, the support 13 is rotatably coupled at a lateral side of a table 71 and the camera head 14 is disposed at a free end of the support 13. On a peripheral side of the circular table 71, a control panel 72 is provided. Here, the control panel 72 is disposed at an extension projecting from the circular contour of the table 71.

Referring to FIG. 8, a periphery of a table 81 has a generally oval contour. The support 13 is rotatably coupled at a lateral side of the table 81 and the camera is mounted at a free end of the support 13. A control panel 82 is provided on the table 81 at a periphery of the oval shaped table. As shown, the top surface of the table 81 may not be maintained in the same level. Here, the table 81 has a little higher central surface and a little lower circumferential surface, both in an oval shape. The buttons 82 are located on the lower circumferential surface.

Figure 9:
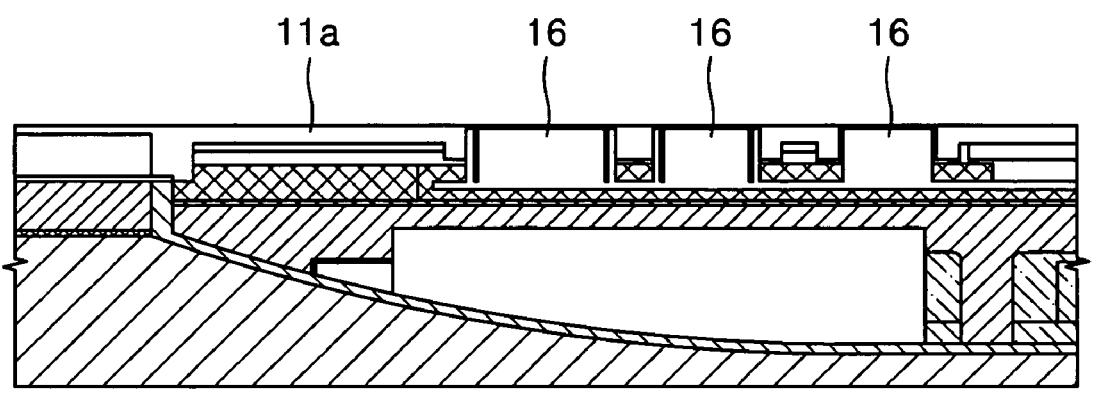
FIG. 9 shows a schematic cross-sectional view of the table of the video present as shown in FIG. 1

FIG. 9 shows a schematic cross-sectional view of the table of the video presenter as shown in FIG. 1.

Referring to FIG. 9, an upper surface 11a of the table 11 and an upper surface of the button 16 are located at the same level. Thus, the buttons 16 do not protrude above the top surface of the table 11 and may be maintained at the same level as the upper surface 11a of the table 11. Such arrangement of the buttons 16 can be applied to the embodiments shown in FIGS. 7 and 8.

The operation of the video presenter according to the present invention will be described herein below.

In order to display an image of the object using the video presenter of the invention, the video presenter should be connected to a display device through the connecting ports 25. For example, with a cable-connection between the USB port of the connecting ports 25 and another USB port of a personal computer (not shown), the image of the object captured by the video presenter can be displayed on a computer monitor.

In order to capture the image of an object, the user puts the object on the top surface of the table 11 and arranges the position of the camera head 14 preferably at a location adjacent to the object. Here, with the rotation of the support 13 relative to the pivot member 12, the camera head 14 may reach an appropriate position for capturing the image. At the same time, the camera head 14 can rotate with respect to the upper end of the support 13.

On the other hand, the lamp 15 can be rotated so as to illuminate the object at an optimal position. In other words, as shown in FIG. 4, the lamp 15 can reach the optimal position by rotating the lamp holder 42 relative to the lamp mount 41.

Further, the space for storing the video presenter may be minimized by collapsing the support 13 as described above.

As has been described herein above, the table for positioning the object thereon has a substantially curved contour, so that the space defined on the table may be utilized with a maximum efficiency and the space for storing the video presenter may be minimized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A video presenter for inputting a video image of an object, comprising:
    a table having a top surface for placing an object thereon, the table having a substantially curved contour of symmetrical shape without having corner areas so as to reduce the size and space for storage;
    a pivot member connected at a lateral side of the table;
    a support arm extending outwardly from the pivot member and rotatably coupled with the pivot member; and
    a camera head with a camera received therein, the camera head rotatably coupled at a free end of the support arm;
    wherein the support arm is capable of folding with respect to the table with the folded support arm coincided with a center line of the table of symmetrical shape and with the camera head rotated to assume a position oriented horizontally and generally parallel to the top surface of the table such that the volume occupied by the video presenter is minimized to store the video presenter in a restricted space.

2. A video presenter as claimed in claim 1, wherein the table has a generally circular contour.

3. A video presenter as claimed in claim 1, wherein the table has a generally oval contour.

4. A video presenter as claimed in claim 1, further including a control panel having a plurality of buttons disposed on the top surface of the table.

5. A video presenter as claimed in claim 4, wherein the top surface of the table is generally planar, and each of the buttons has an upper surface maintained at the same level as the top surface of the table.

6. A video presenter as claimed in claim 4, wherein the top surface of the table includes a central surface and a lowered circumferential surface, and each of the buttons are located at the lowered circumferential surface.

7. A video presenter as claimed in claim 1, wherein connection ports are provided at one side of the table and power connectors are provided at another side of the table.

8. A video presenter as claimed in claim 1, wherein a lamp is affixed to the support arm to illuminate the object placed on the top surface of the table, the lamp being adjustable between first and second positions to adjust illumination to the object.

* * * * *